United States Patent
Pan

(10) Patent No.: US 7,103,327 B2
(45) Date of Patent: Sep. 5, 2006

(54) SINGLE SIDE BAND TRANSMITTER HAVING REDUCED DC OFFSET

(75) Inventor: Meng-An Pan, Cerritos, CA (US)

(73) Assignee: Broadcom, Corp., Irvine, CA (US)

( * ) Notice: Subject to any disclaimer, the term of this patent is extended or adjusted under 35 U.S.C. 154(b) by 837 days.

(21) Appl. No.: 10/173,740

(22) Filed: Jun. 18, 2002

(65) Prior Publication Data

US 2003/0232605 A1   Dec. 18, 2003

(51) Int. Cl.
*H04B 1/06* (2006.01)

(52) U.S. Cl. .................. 455/102; 455/118; 455/91; 455/114.4; 375/270; 375/296; 375/301; 332/159

(58) Field of Classification Search ............. 455/102, 455/118, 91, 114.4; 375/270, 296, 301, 297, 375/298; 332/159, 106, 103

See application file for complete search history.

(56) References Cited

U.S. PATENT DOCUMENTS

| | | | | |
|---|---|---|---|---|
| 6,078,628 A | * | 6/2000 | Griffith et al. | 332/106 |
| 6,115,428 A | * | 9/2000 | Kim | 375/301 |
| 6,615,027 B1 | * | 9/2003 | Sahota et al. | 455/91 |
| 6,658,065 B1 | * | 12/2003 | Della Torre et al. | 375/296 |
| 6,731,693 B1 | * | 5/2004 | Damgaard | 455/114.1 |
| 2004/0102170 A1 | * | 5/2004 | Jensen et al. | 455/102 |

* cited by examiner

*Primary Examiner*—Edward F. Urban
*Assistant Examiner*—Lana Le
(74) *Attorney, Agent, or Firm*—Garlick, Harrison & Markison, LLP; Timothy W. Markison

(57) ABSTRACT

A single side band transmitter having reduced DC offset includes a current source modulation module, a current mirror module, a $1^{st}$ mixing module, a $2^{nd}$ mixing module, a summing module, and a power amplifier. The current source module is operably coupled to modulate, in accordance with a modulation protocol (e.g., FSK) data to produce an in-phase current component and a quadrature current component. The current mirror module is operably coupled to mirror the in-phase current component to produce a mirrored in-phase current component and is also operably coupled to mirror the quadrature current component to produce a mirrored quadrature current component. The $1^{st}$ mixing module is operably coupled to mix the mirrored in-phase current component with an in-phase current component of a local oscillation to produce a $1^{st}$ mixed current signal. The $2^{nd}$ mixing module is operably coupled to mix the mirrored quadrature current component with a quadrature component of the local oscillation to produce a $2^{nd}$ mixed current signal. The summing module is operably coupled to sum the $1^{st}$ and $2^{nd}$ mixed current signals to produce an up converted signal. The power amplifier amplifies the up converted signal prior to transmission as a radio frequency signal.

22 Claims, 8 Drawing Sheets transmitter 100

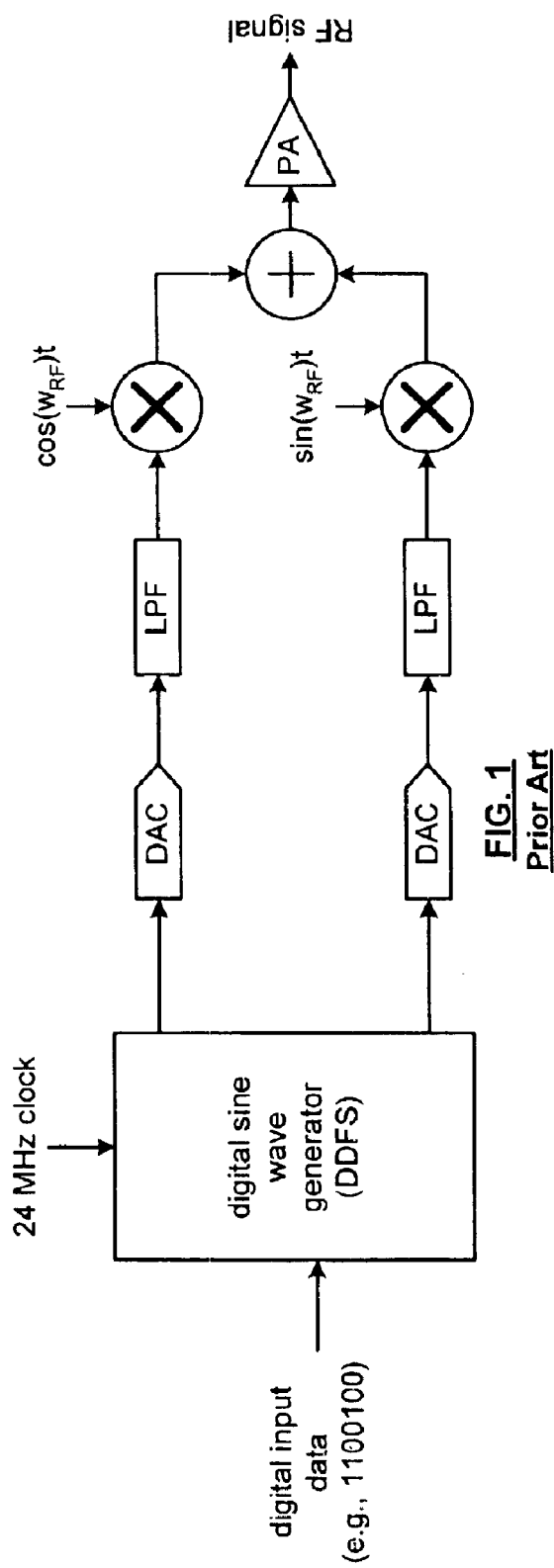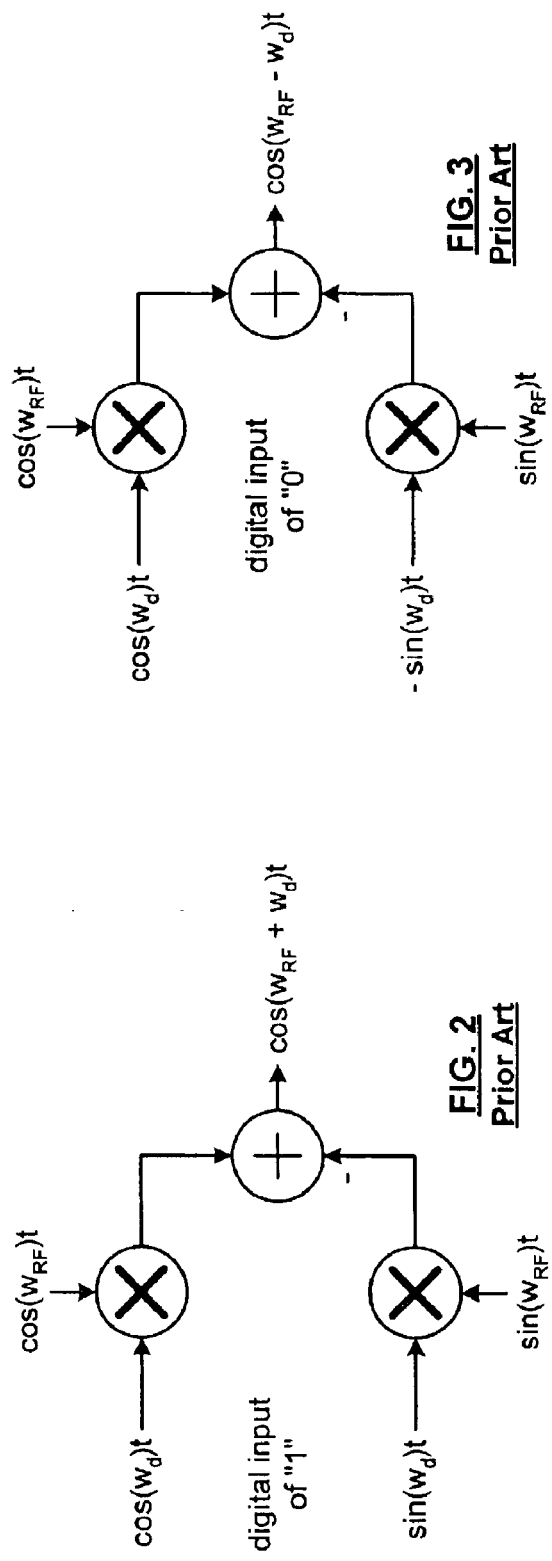

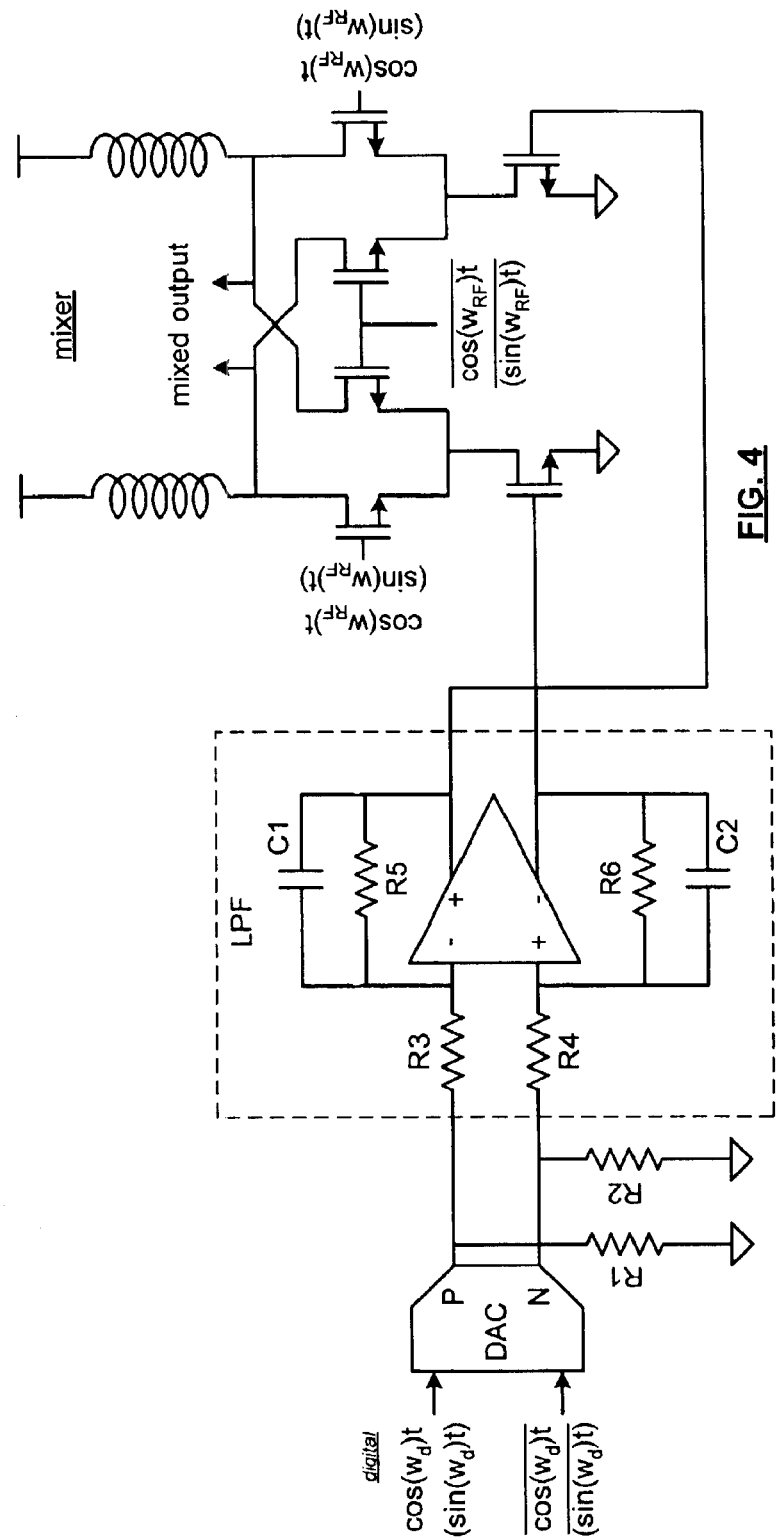
FIG. 4
*Prior Art*
FIG. 6
*Prior Art*
FIG. 5
*Prior Art* transmitter 100 transmitter 130

SINGLE SIDE BAND TRANSMITTER HAVING REDUCED DC OFFSET

BACKGROUND OF THE INVENTION

1. Technical Field of the Invention

This invention relates generally to wireless communication systems and more particularly to radio frequency (RF) transmitters used within such wireless communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is also known, the receiver is coupled to the antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signals into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with ore or more local oscillations to produce RF signals. The power amplifier amplifies the RF signals prior to transmission via an antenna.

FIG. 1 illustrates a frequency shift keying (FSK) based transmitter of the prior art. The transmitter includes a digital sine wave generator that may be implemented utilizing a direct digital frequency synthesizer (DDFS), digital to analog converters, low pass filters, mixers, a su ming module, and a power amplifier. The digital sine wave generator receives digital input data, filters the data using a digital Gaussian low pass filter that is clocked at 24 megahertz, and generates a digital in-phase component and a digital quadrature component based on the filtered data. The instantaneous frequency of the in-phase and quadrature components of the modulation frequency, which is the frequency deviation for FSK (frequency shift keying) modulation, is denoted as $\omega_d$. For example, as shown in FIG. 2, when the digital input data is a logic 1, the digital sine wave generator produces a digital cosine wave at its $1^{st}$ output and a digital sine wave at its $2^{nd}$ output. The $1^{st}$ output is processed via a digital to analog converter and a low pass filter and then mixed via a mixer with a cosine signal having a frequency at the radio frequency, i.e., cos $(\omega_{RF})$t, which corresponds to a in-phase component of a local oscillation. The $2^{nd}$ output of the digital sine wave generator is processed by another digital to analog converter and another low pass filter and mixed with a sine wave having a frequency at the radio frequency, i.e., sin $(\omega_{RF})$t, which corresponds to a quadrature component of a local oscillation. As shown in FIG. 2, the output of the mixers are summed, producing a cosine waveform having a frequency that is the sum of the local oscillation $(\omega_{RF})$ and the modulating frequency $(\omega_d)$. For example, for FSK modulation as used in a Bluetooth application, the modulating frequency is 166 kilohertz.

When the digital input data is a logic 0, the digital sine wave generator produces a cosine wave on its $1^{st}$ output and a negative sine wave on its $2^{nd}$ output. These outputs are processed by the respective digital to analog converters and low pass filters and presented as analog sine and cosine waveforms to the mixers. FIG. 3 illustrates the mixing of the cosine wave of the data with a cosine wave of the local oscillation and the mixing of the negative sine wave of the data with the sine wave of the local oscillation. The outputs of the mixers are summed producing a cosine wave that has a frequency that is the radio frequency $(\omega_{RF})$ minus the modulating frequency $(\omega_d)$. As such, for a digital input of 1, the resulting radio frequency signal is the local oscillation $(\omega_{RF})$ plus the modulating frequency $(\omega_d)$ and for a logic 0 the resulting frequency is the radio frequency $(\omega_{RF})$ minus the modulating frequency $(\omega_d)$. Thus, for an FSK Bluetooth application, a logic 1 is represented by a cosine wave having its instantaneous frequency equal to the radio frequency plus 166 kilohertz and a logic 0 is represented by a cosine wave having its instantaneous frequency equal to the radio frequency minus 166 kilohertz.

Such an FSK based transmitter generates a DC offset, which yields local oscillation (LO) leakage that is in band for the RF transmission. Thus, when a receiver receives the RF signal, it also receives the LO leakage. As such, the receiver processes the LO leakage along with the RF signal. If the LO leakage is small with respect to the RF signal, it has little adverse affect on the accurate recovery of data from the RF signals. As the magnitude of the LO leakage increases with respect to the RF signals, its presence decreases the receiver's ability to accurately recapture data from the RF signals.

FIG. 4 illustrates a portion of the FSK based transmitter in greater detail to illustrate how the LO leakage is created. As shown, one output of the digital sine wave generator is converted to an analog current signal by a differential digital to analog converter. The outputs of the digital to analog converter are coupled to ground, or a reference potential, via resistors R1 and R2 and to input resistors R3 and R4 of the low pass filter. Resistors R1 and R2 function to convert the current based output of the digital to analog converter into voltage signals. The low pass filter includes resistors R3–R6 and capacitors C1 and C2 to perform differential low pass filtering. The differential output of the low pass filter is provided to the differential inputs of the mixer. As shown, the mixer mixes the differential output of the low pass filter with a differential local oscillation (e.g., $\cos(\omega_{RF})t$ or $\sin(\omega_{RF})t$). In general, the FSK transmitter of FIG. 4 converts the data signals from current signals to voltage signals back to current signals within the mixer. Mismatches between R1 and R2, R5/R3 and R6/R4 cause a DC offset to exist in the differential signal provided to the mixer. The DC offset is further increased by mismatches in the input transistors of the mixer.

FIGS. 5 and 6 illustrate the local oscillation (LO) leakagn/e that is created as a result of the DC offset produced by the mismatches in the current to voltage conversion and within the low pass filter. As shown, the LO leakage appears at the radio frequency. If the DC offset is minimal, the magnitude of the LO leakage is relatively small with respect to the magnitude of the desired RF signal (RF−d or RF+d). However, in many applications, the LO leakage produced by the mismatches between R1 and R2 and the mismatches of the components within the low pass filter is too large.

Therefore, a need exists for a method and apparatus that reduces DC offset within a FSK base transmitter thus producing the resulting LO leakage.

BRIEF SUMMARY OF THE INVENTION

The single side band transmitter having reduced DC offset of the present invention substantially meets these needs and others. Such a single side band transmitter includes a current source modulation module, a current mirror module, a $1^{st}$ mixing module, a $2^{nd}$ mixing module, a summing module, and a power amplifier. The current source module is operably coupled to modulate, in accordance with a modulation protocol (e.g., FSK) data to produce an in-phase current component and a quadrature current component. The current mirror module is operably coupled to mirror the in-phase current component to produce a mirrored in-phase current component and is also operably coupled to mirror the quadrature current component to produce a mirrored quadrature current component. The $1^{st}$ mixing module is operably coupled to mix the mirrored in-phase current component with an in-phase current component of a local oscillation to produce a $1^{st}$ mixed current signal. The $2^{nd}$ mixing module is operably coupled to mix the mirrored quadrature current component with a quadrature component of the local oscillation to produce a $2^{nd}$ mixed current signal. The summing module is operably coupled to sum the $1^{st}$ and $2^{nd}$ mixed current signals to produce an up converted signal. The power amplifier amplifies the up converted signal prior to transmission as a radio frequency signal. With such a single side band transmitter, the modulation of data and subsequent mixing of the modulated data remains in the current domain. By remaining in the current domain, the production of DC offset in the signals presented to the mixer is substantially eliminated. As such, the resulting LO leakage is reduced.

Another embodiment of a single side band transmitter includes means for modulating, means for maintaining, means for summing, and means for amplifying. The means for modulating is operably coupled to modulate data in accordance with a modulation protocol (e.g., FSK) to produce an in-phase current component and a quadrature phase current component. The means for maintaining is operably coupled to maintain the in-phase current component and the quadrature phase current component in a current domain when mixing with a local oscillation to produce a $1^{st}$ mixed current signal and a $2^{nd}$ mixed current signal. The means for summing is operably coupled to mix the $2^{nd}$ mixed current signal with the $1^{st}$ mixed current signal to produce a radio frequency signal. The means for amplifying is operably coupled to amplify the RF signal prior to transmission. In such a single side band transmitter, the in-phase and quadrature phase current components have improved DC offset performance. As such, when mixed with the local oscillation, minimal LO leakage is generated as a result of the in-phase current component and quadrature current component.

BRIEF DESCRIPTION OF THE SEVERAL VIEWS OF THE DRAWINGS

FIGS. 1–6 illustrate a prior art FSK based transmitter and corresponding production of LO leakage;

DETAILED DESCRIPTION OF THE INVENTION

Figure 7:
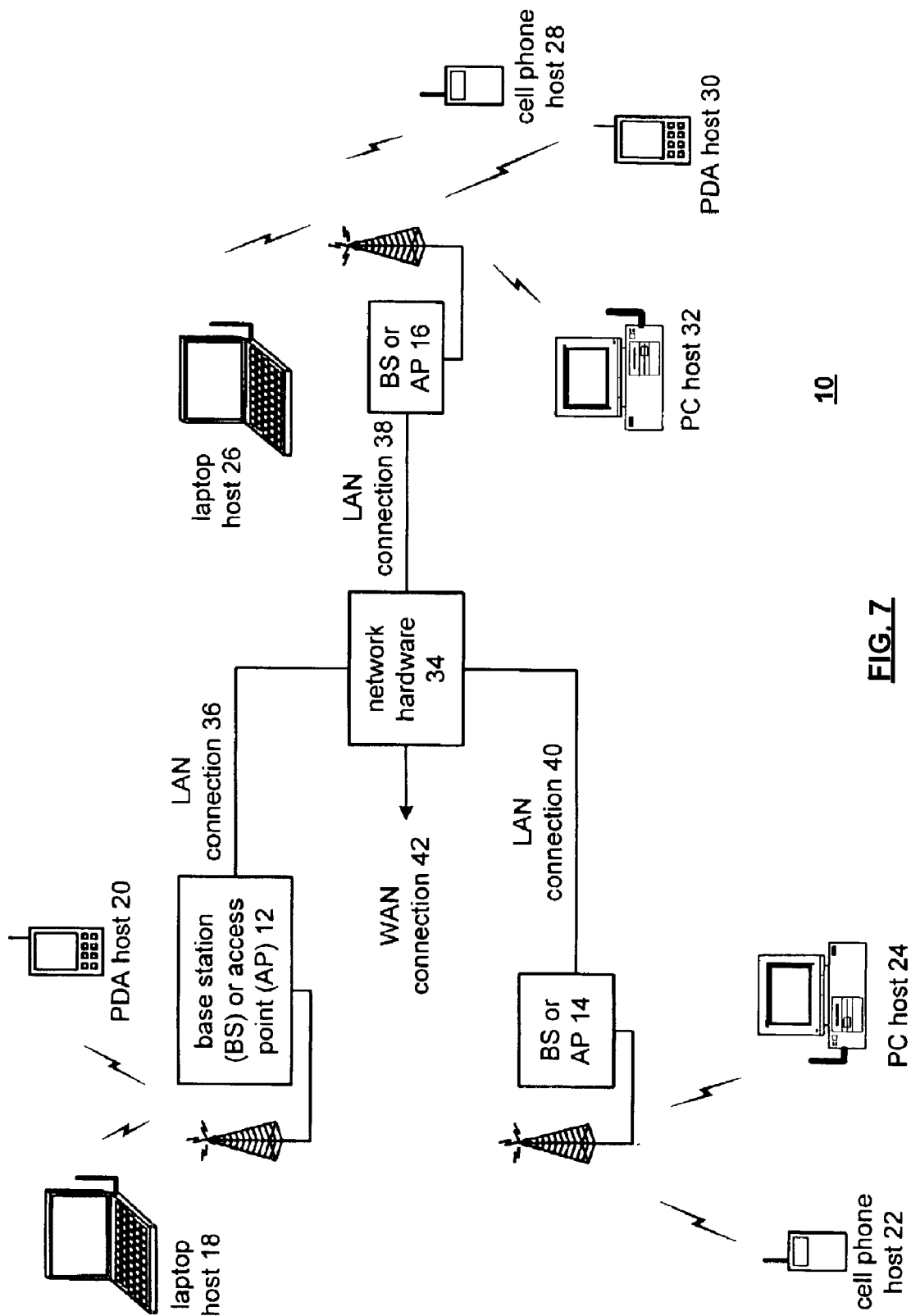
FIG. 7 is a schematic block diagram of a wireless communication system in accordance with the present invention.
Figure 8:
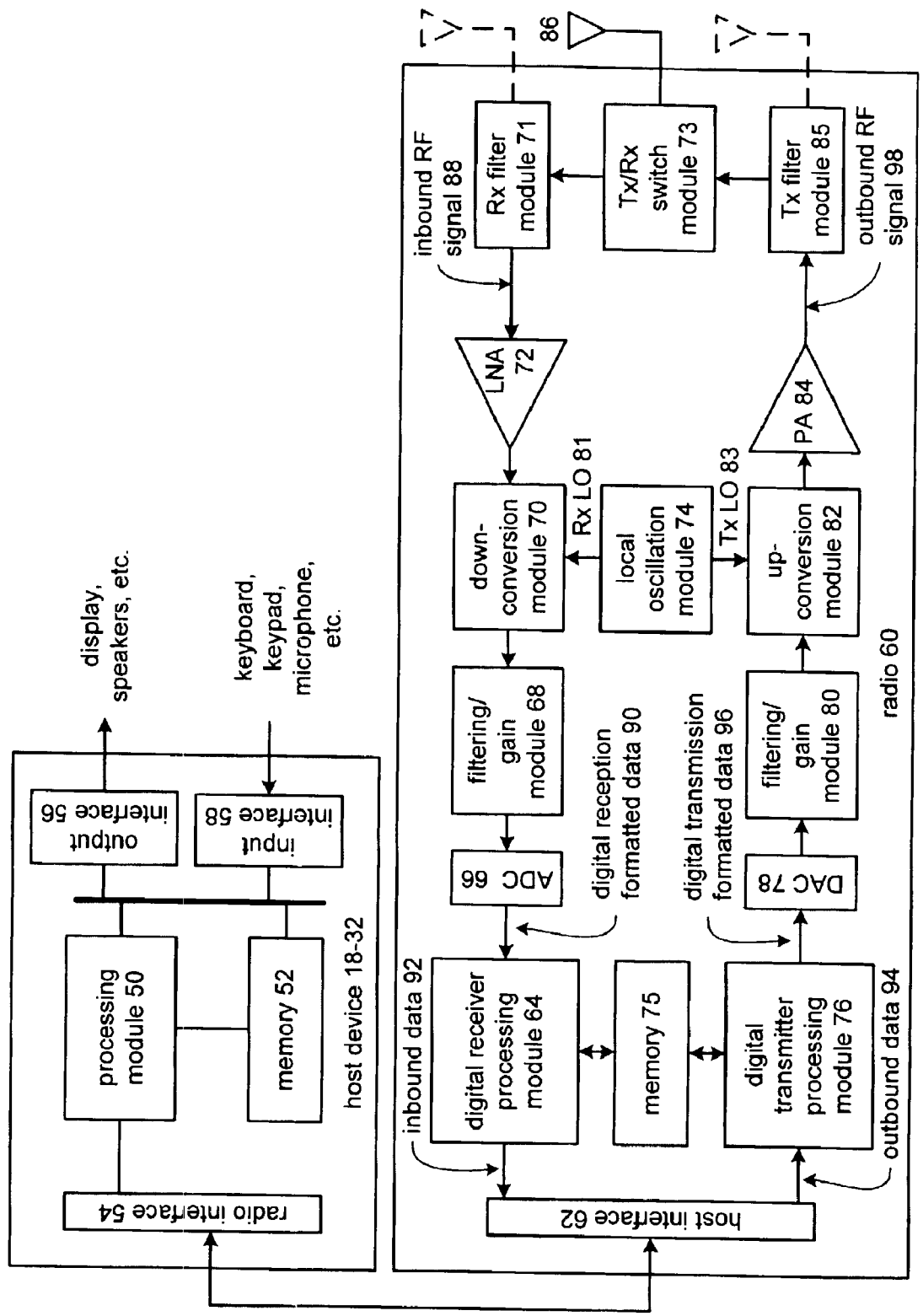
FIG. 8 is a schematic block diagram of a wireless communication device in accordance with the present invention.

FIG. 1 is a schematic block diagram illustrating a communication system 10 that includes a plurality of base stations and/or access points 12–16, a plurality of wireless communication devices 18–32 and a network hardware component 34. The wireless communication devices 18–32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 2.

The base stations or access points 12–16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12–16 has an associated antenna or antenna array to communicate with the wireless communication devices in its area. Typically, the wireless communication devices register with a particular base station or access point 12–14 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

FIG. 2 is a schematic block diagram illustrating a wireless communication device that includes the host device 18–32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18–32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the Tx/Rx switch 77, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on a transmitter local oscillation 83 provided by local oscillation module 74. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 77, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74. The down conversion module 70 provides the inbound low IF signal or baseband signal to the filtering/ attenuation module 68. The filtering/attenuation module 68 filters and/or attenuates the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 9:
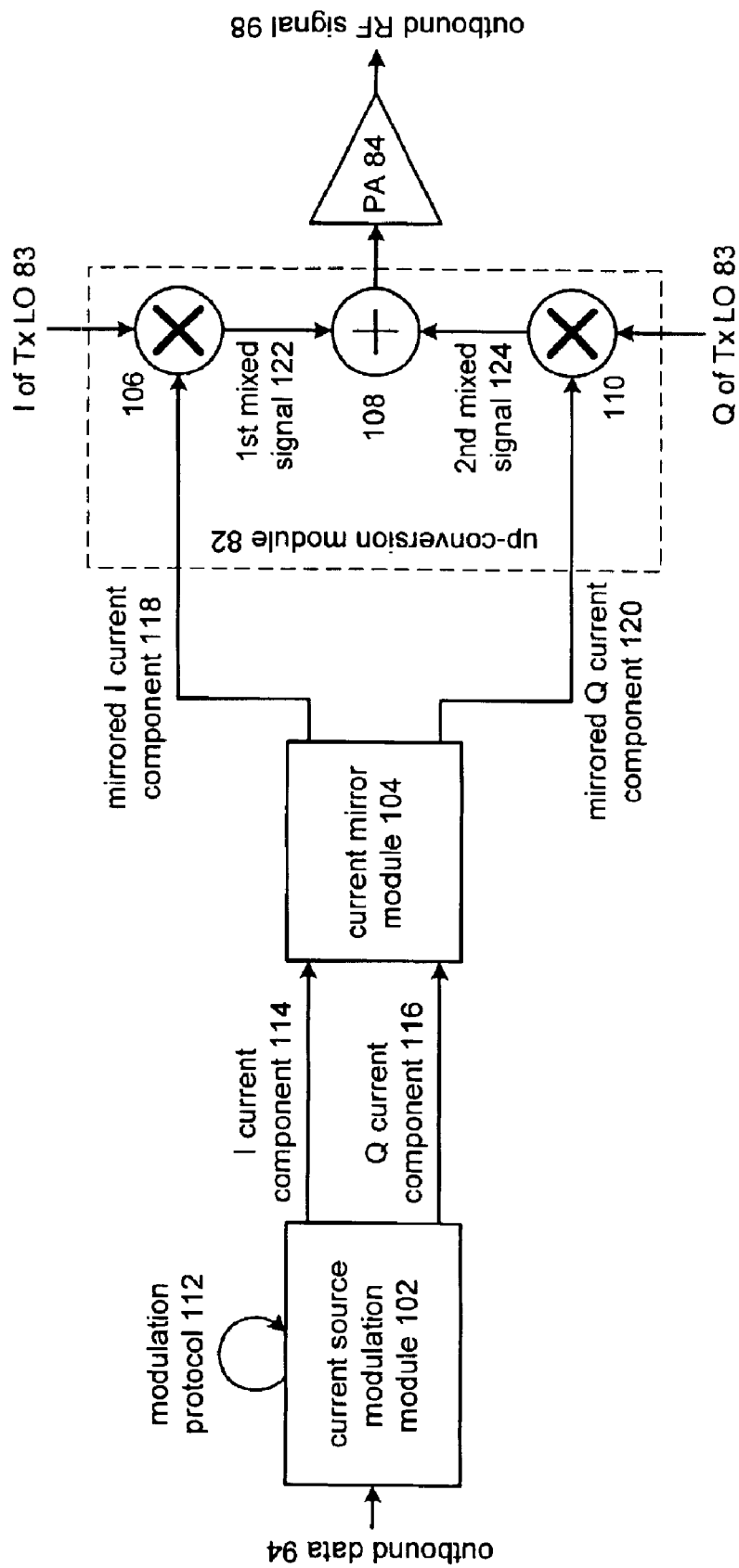
FIG. 9 is a schematic block diagram of a transmitter in accordance with the present invention.

FIG. 9 illustrates a transmitter 100, which may be used in the radio 60, includes a current source modulation module 102, a current mirror module 104, an up conversion module 82 and a power amplifier 84. The current source modulation module 102 is operably coupled to receive outbound data 94 (e.g., 0110 . . . ) and produce therefrom an in-phase (I) current component 114 and a quadrature (Q) current component 116. The current source modulation module 102 produces these outputs by performing a modulation protocol 112 upon the outbound data 94. The modulation protocol may be frequency shift keying, binary phase shift keying, quadrature phase shift keying, quadrature amplitude modulation or frequency modulation. For example, if the modulation protocol 112 is frequency shift keying, the outbound data 94 will be modulated to have a positive frequency component for a logic 1 and a negative frequency component for a logic 0. The positive and negative frequency shifts are represented by sine waves and cosine waves used as the in-phase current component 114 and/or the quadrature phase current component 116.

The current mirror module 104 receives the I current component 114 and mirrors it to produce mirrored I current component 118. The current mirror module 104 also receives the Q current component 116 and mirrors it to produce a mirrored Q current component 120. The current mirror 104, which will be described in greater detail with reference to FIGS. 10 and 11, maintains the I and Q current components 114 and 116 in the current domain. The current mirror module 104 has a gain of 1 such that from the output of the current source modulation module 102 to the input of the up conversion module 82, negligible DC offset is generated. As such, whatever LO leakage is generated by the transmitter 100 is due to mismatches in the input transistors of mixers 110 and 106.

The up conversion module 82 includes a $1^{st}$ mixing module 106, $2^{nd}$ mixing module 110, and a summing module 108. The $1^{st}$ mixing module 106 mixes the mirrored I current component 118 with an I component of the transmitter local oscillation 83 to produce a $1^{st}$ mixed signal 122. The $2^{nd}$ mixer 110 mixes the mirrored Q current component 120 with a Q component of the transmitter local oscillation 83 to produce a $2^{nd}$ mixed signal 124. Note that the mirrored I current component 118 and mirrored Q current component 120, for FSK modulation, are a sine wave and cosine wave or cosine wave and sine wave depending on whether a logic 0 or a logic 1 is being encoded as was described with reference to FIGS. 2 and 3.

The summing module sums the $1^{st}$ mixed signal 122 and the $2^{nd}$ mixed signal 124 to produce an up converted signal. The up converted signal is amplified via the power amplifier 84 to produce the outbound RF signal 98.

Figure 10:
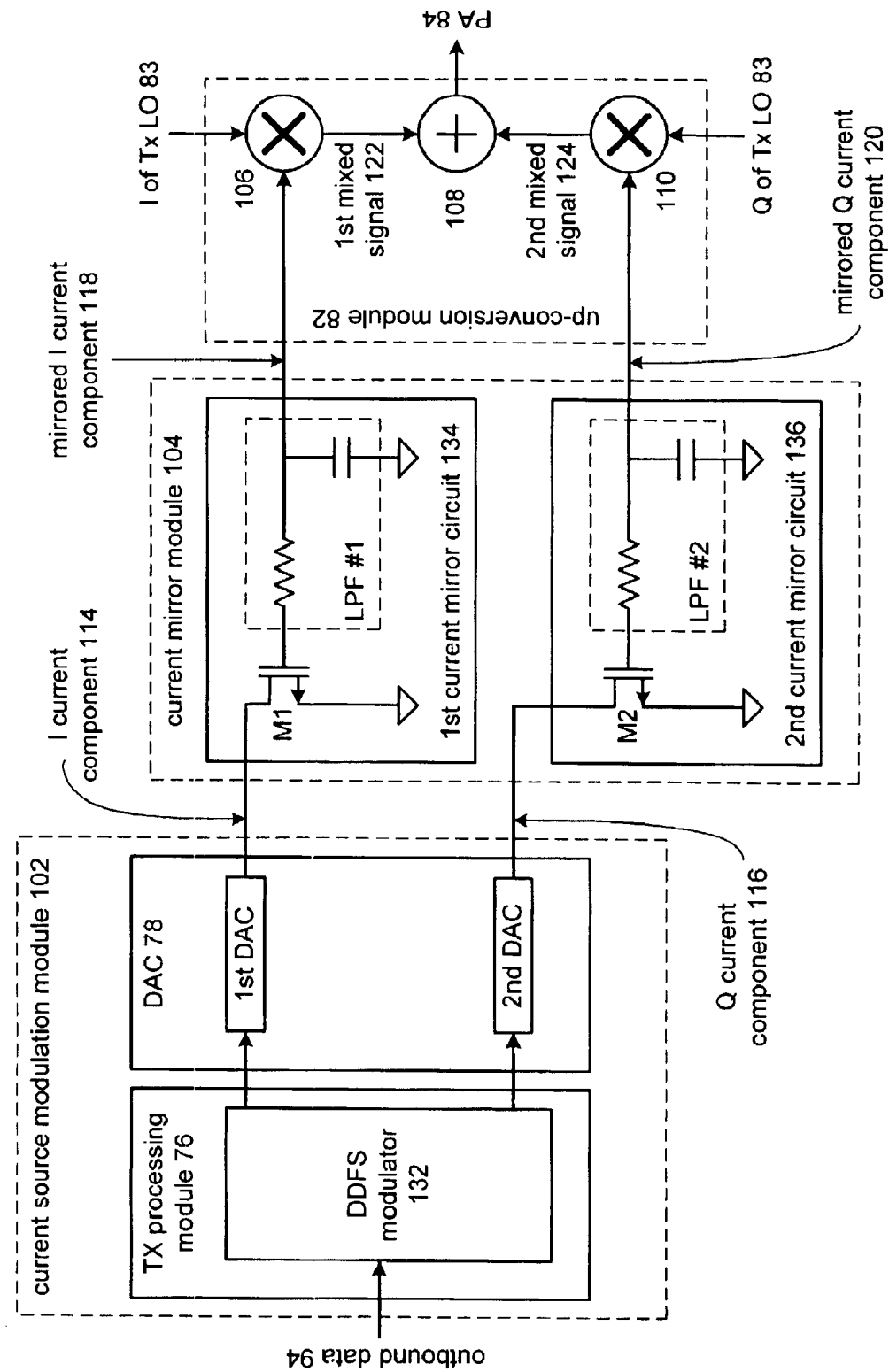
FIG. 10 is a schematic block diagram of an alternate transmitter in accordance with the present invention.

FIG. 10 illustrates an alternate schematic block diagram of a transmitter 130 that may be used in radio 60. The transmitter 130 includes the current source module 102, current mirror module 104, and the up conversion module 82, which is coupled to the power amplifier 84. The current source modulation module 102 includes the transmitter processing module 76, which is configured to perform DDFS (direct digital frequency synthesizer) modulation 132, and a digital to analog converter (DAC) module 78, which includes a $1^{st}$ DAC and a $2^{nd}$ DAC. In operation, the DDFS modulator 132 receives the outbound data 94, which is in a raw data format. The DDFS modulator generates a digital cosine wave having a frequency of 166 kilohertz for FSK modulation of a logic 1, which is provided to the $1^{st}$ DAC, and provides a digital sine wave having a frequency of 166 kilohertz to the $2^{nd}$ DAC. The DDFS modulator 132, when modulating a logic 0 of outbound data 94, provides a digital cosine wave to the $1^{st}$ DAC and a digital negative sine wave to the $2^{nd}$ DAC.

The $1^{st}$ DAC converts the digital cosine wave or the digital sine wave into an analog in-phase current component 114. Similarly, the $2^{nd}$ DAC converts the digital sine wave or the digital cosine wave into an analog quadrature phase current component 116.

The current mirror module 104 includes a $1^{st}$ current mirror circuit 134 and a $2^{nd}$ current mirror circuit 136. Each of the current mirror circuits 134 and 136 includes a mirroring transistor M1 and M3, which are matched to the input transistors of the mixers 106 and 110. In addition, each of the $1^{st}$ and $2^{nd}$ current mirror circuits 134 and 136 include a low pass filter. Each transistor M1 and M3 mirrors the respective currents 114 and 116 to the input transistors of the $1^{st}$ and $2^{nd}$ mixers 106 and 110. The low pass filters, LPF#1 and LPF#3, do not induce any DC offset since the gain between the gate of M1 and M3 and the respective input transistors of the mixers 106 and 110 is one.

Figure 11:
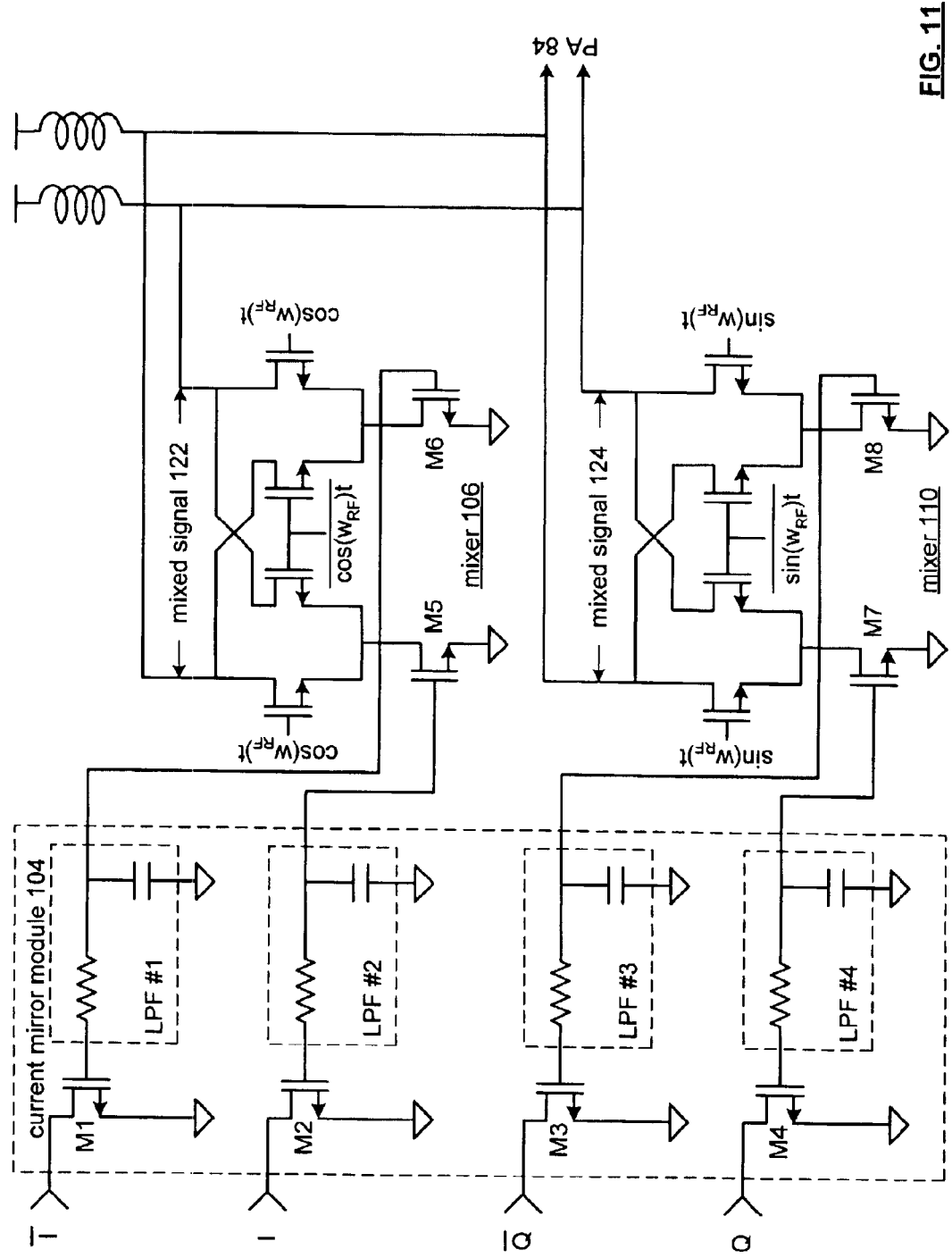
FIG. 11 is a schematic block diagram further illustrating a current mirror module and mixers in accordance with the present invention.

FIG. 11 illustrate a more detailed schematic block diagram of current mirror module 104 coupled to mixers 106 and 110. As shown, mixers 106 and 110 are differential mixers that include input transistors M5 and M6 of mixer 106 and input transistors M7 and M8 of mixer 110. The remaining components of mixers 106 and 110 are switching transistors and load inductors, which are shared by the mixers. The direct coupling of the mixed signals 122 and 124 provide the summing.

The current mirror module 104 includes four current mirror circuits, each including a mirroring transistor M1–M4 and a low pass filter LPF#1–LPF#4. As shown, transistor M1 is coupled to receive the inverse of the in-phase current while transistor M2 receives the in-phase current component 114. As shown, the gate of M1, via the low pass filter, is coupled to the gate of transistor M6 of mixer 106. Similarly, the gate of transistor M2 is coupled via the low pass filter to the gate of input transistor M5 of mixer 106. By matching transistors M1 and M2 to M6 and M5, respectively, the current through transistor M1 is mirrored through transistor M6 and the current through M2 is mirrored through transistor M5. As such, the current from the output of the DAC's remains in a current domain through the low pass filter into the mixers. Accordingly, the imbalances in prior art low pass filters and current to voltage transitions are overcome.

The input transistors M7 and M8 of mixer 110 are similarly matched to transistors M4 and M3 of the current mirror module 104, respectively. Transistor M3 is coupled to receive the inverse of the quadrature current component and transistor M4 is coupled to receive the quadrature current component. By matching transistors M4 and M3 to M7 and M8, respectively, the current through transistor M4 is mirrored through transistor M7 and the current through M3 is mirrored through transistor M8. As such, the current from the output of the DAC's remains in a current domain through the low pass filter into the mixers.

Figure 12:
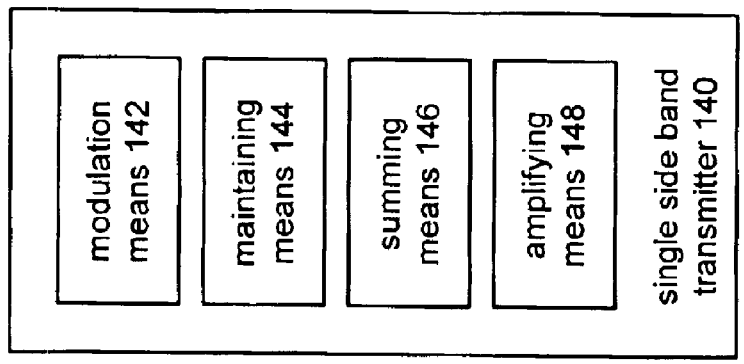
FIG. 12 is a schematic block diagram illustrating an alternate single side band transmitter in accordance with the present invention.

FIG. 12 is a schematic block diagram illustrating a single side band transmitter 140 that includes modulation means 142, maintaining means 144, summing means 146, and amplifying means 148. The means 142–148 may be a single device or a plurality of devices. A device may be a single processing device or a plurality of processing devices and may further include memory. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, and/or any device that stores digital information. Note that when a device implements one or more of its functions via a state machine, analog circuitry, digital circuitry, and/or logic circuitry, the corresponding operational instructions are embedded with the circuitry comprising the state machine, analog circuitry, digital circuitry, and/or logic circuitry. In general, the memory stores, and the processing device executes, operational instructions corresponding to at least some of the steps and/or functions illustrated in FIG. 13.

Figure 13:
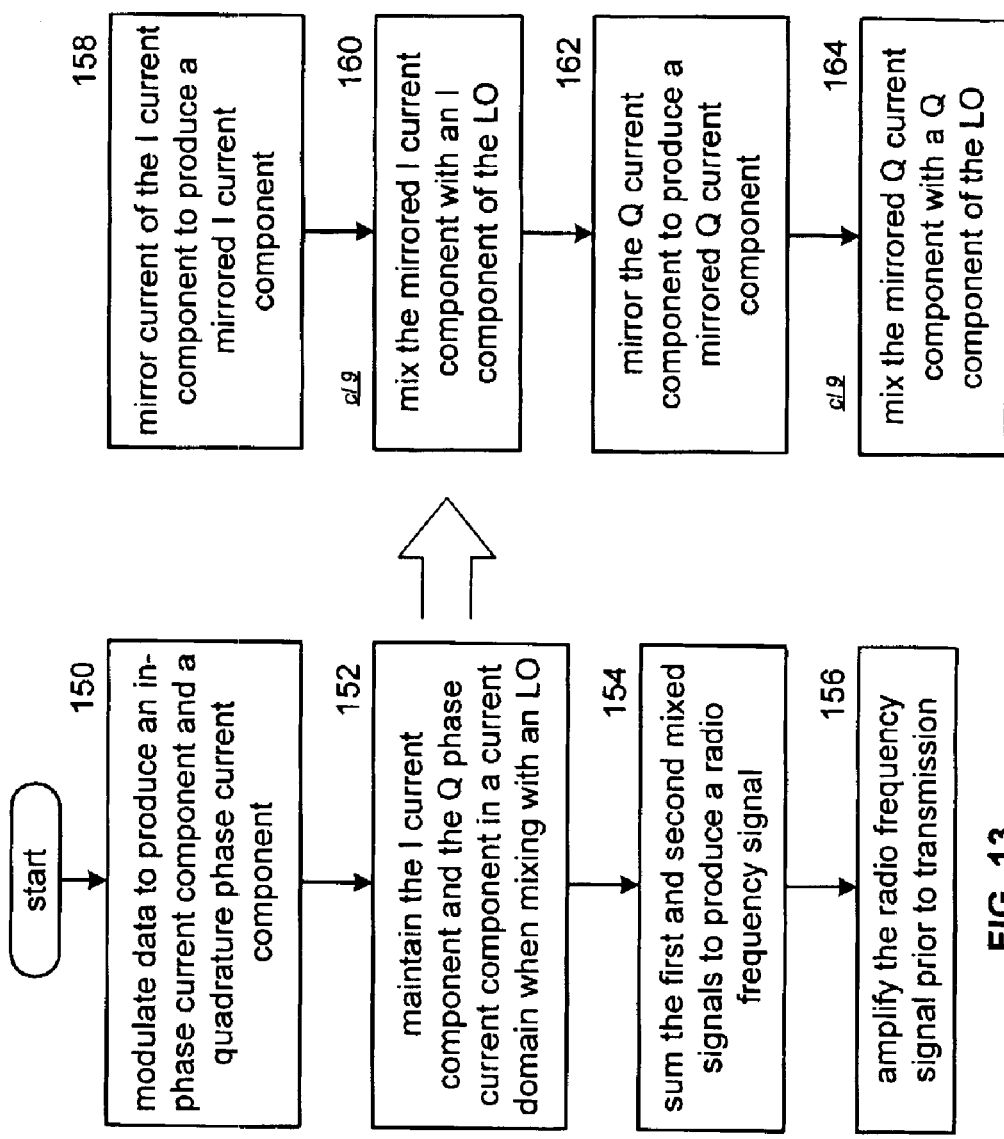
FIG. 13 is a logic diagram of a method for reducing DC offset in single side band transmissions.

FIG. 13 is a logic diagram illustrating a method for reducing DC offset in single side band transmissions. The process begins at Step 150 where data is modulated to produce an in-phase current component and a quadrature phase current component. The modulation may be done in accordance with frequency shift keying, binary phase shift keying, quadrature phase shift keying, quadrature amplitude modulation, or frequency modulation. The in-phase and quadrature current components may be produced as single ended signals or differential signals. Whether differential signals or single ended signals, the in-phase current component and quadrature phase current component are converted from the digital domain to the analog domain.

The process then proceeds to Step 152 where the I current component and the Q current component are maintained in the current domain when mixed with a local oscillation. This may be done as illustrated in Steps 158–164. At Step 158, the in-phase current component is mirrored to produce a mirrored I current component. The process then proceeds to Step 160 where the mirrored I current component is mixed with an I component of the local oscillation to produce a $1^{st}$ mixed current signal. Note that prior to mixing, the I current component may be low pass filtered.

At Step 162, the Q current component is mirrored to produce a mirrored Q component. The process then proceeds to Step 164 where the mirrored Q current component is mixed with a Q component of the local oscillation to produce a $2^{nd}$ mixed signal. The mirrored Q current component may be low pass filtered prior to the mixing step.

Returning to the main flow of FIG. 13, the process continues at Step 154 where the $1^{st}$ and $2^{nd}$ mixed signals are summed to produce a radio frequency signal. The process then proceeds to Step 156 where the radio frequency signal is amplified prior to its transmission.

The preceding discussion has presented a method and apparatus for reducing DC offset in a single side band transmitter. As one of average skill in the art will appreciate, other embodiments may be derived from the teachings of the present invention, without deviating from the scope of the claims.

What is claimed is:

1. A single side band transmitter comprises:
   current source modulation module operably coupled to modulated, in accordance with a modulation protocol, data to produce an in-phase current component and a quadrature current component;
   current mirror module operably coupled to mirror the in-phase current component to produce a mirrored in-phase current component and operably coupled to mirror the quadrature current component to produce a mirrored quadrature current component;
   first mixing module operably coupled to mix the mirrored in-phase current component with an in-phase component of a local oscillation to produce a first mixed signal;
   second mixing module operably coupled to mix the mirrored quadrature current component with a quadrature component of the local oscillation to produce a second mixed signal;
   summing module operably coupled to sum the first and second mixed signals to produce an up-converted signal; and
   power amplifier operably coupled to amplify the up-converted signal to produce a radio frequency signal.

2. The single side band transmitter of claim 1, wherein the modulation protocol comprises at least one of: frequency shift keying, binary phase shift keying, quadrature phase shift keying, quadrature amplitude modulation, and frequency modulation.

3. The single side band transmitter of claim 1, wherein the current mirror module further comprises:
   first current mirror circuit that includes a first transistor and a first low pass filter, wherein the first transistor substantially matches an input transistor of the first mixing module, and wherein the first low pass filter is operably coupled to the first transistor and the input transistor of the first mixing module; and
   second current mirror circuit that includes a second transistor and a second low pass filter, wherein the second transistor substantially matches an input transistor of the second mixing module, and wherein the second low pass filter is operably coupled to the second transistor and the input transistor of the second mixing module.

4. The single side band transmitter of claim 1, wherein the current source modulation module further comprises:
   modulator operably coupled to modulate the data to produce a digital in-phase component and a digital quadrature component;
   first digital to analog conversion module operably coupled to convert the digital in-phase component into the in-phase current component; and
   second digital to analog conversion module operably coupled to convert the digital quadrature component into the quadrature current component.

5. The single side band transmitter of claim 4 further comprises:
   the modulator producing a differential digital in-phase component and a differential digital quadrature component;
   the first digital to analog conversion module including a first digital to analog converter for converting one leg of the differential digital in-phase component into one leg of a differential in-phase current component and a second digital to analog converter for converting another leg of the differential digital in-phase component into another leg of the differential in-phase current component; and
   the second digital to analog conversion module including a third digital to analog converter for converting one leg of the differential digital quadrature component into one leg of a differential quadrature current component and a fourth digital to analog converter for converting another leg of the differential digital quadrature component into another leg of the differential quadrature current component.

6. The single side band transmitter of claim 5, wherein the current mirror module further comprises:
   first current mirror circuit that includes a first transistor and a first low pass filter, wherein the first transistor substantially matches a first input transistor of the first mixing module, and wherein the first low pass filter is operably coupled to the first transistor and the first input transistor of the first mixing module;
   second current mirror circuit that includes a second transistor and a second low pass filter, wherein the second transistor substantially matches a second input transistor of the first mixing module, and wherein the second low pass filter is operably coupled to the second transistor and the second input transistor of the first mixing module;
   third current mirror circuit that includes a third transistor and a third low pass filter, wherein the third transistor substantially matches a first input transistor of the second mixing module, and wherein the third low pass filter is operably coupled to the third transistor and the first input transistor of the second mixing module; and
   fourth current mirror circuit that includes a fourth transistor and a fourth low pass filter, wherein the fourth transistor substantially matches a second input transistor of the second mixing module, and wherein the fourth low pass filter is operably coupled to the fourth transistor and the second input transistor of the second mixing module.

7. A method for reduced DC offset in single side band transmissions, the method comprises:
   modulating, in accordance with a modulation protocol, data to produce an in-phase current component and a quadrature phase current component;
   maintaining the in-phase current component and the quadrature phase current component in a current domain when mixing with a local oscillation to produce a first mixed signal and a second mixed signal;
   summing the first and second mixed signals to produce a radio frequency signal; and
   amplifying the radio frequency signal prior to transmission.

8. The method of claim 7, wherein the maintaining the in-phase current component and the quadrature current component in the current domain further comprises:
   mirroring current of the in-phase current component to produce a mirrored in-phase current component;
   mixing the mirrored in-phase current component with an in-phase component of the local oscillation to produce the first mixed signal;
   mirroring the quadrature current component to produce a mirrored quadrature current component; and
   mixing the mirrored quadrature current component with a quadrature component of the local oscillation to produce the second mixed signal.

9. The method of claim 8, wherein the maintaining the in-phase current component and the quadrature current component in the current domain further comprises:
   low pass filtering the mirrored in-phase current component prior to the mixing; and
   low pass filtering the mirrored quadrature current component prior to the mixing.

10. The method of claim 7, wherein the modulating the data further comprises at least one of:
    modulating the data in accordance with frequency shift keying;
    modulating the data in accordance with binary phase shift keying;
    modulating the data in accordance with quadrature phase shift keying;
    modulating the data in accordance with quadrature amplitude modulation; and
    modulating the data in accordance with frequency modulation.

11. The method of claim 7, wherein the modulating the data further comprises:
    modulating the data to produce a digital in-phase component and a digital quadrature component;
    converting the digital in-phase component into the in-phase current component; and
    converting the digital quadrature component into the quadrature current component.

12. The method of claim 7, wherein the modulating the data further comprises:
    producing a differential digital in-phase component and a differential digital quadrature component;
    converting one leg of the differential digital in-phase component into one leg of a differential in-phase current component;
    converting another leg of the differential digital in-phase component into another leg of the differential in-phase current component;
    converting one leg of the differential digital quadrature component into one leg of a differential quadrature current component; and
    converting another leg of the differential digital quadrature component into another leg of the differential quadrature current component.

13. The method of claim 12 further comprises:
mirroring current of the one leg of the differential in-phase current component to produce a first mirrored in-phase current component;
mixing the first mirrored in-phase current component with one leg of an in-phase component of the local oscillation to produce one leg of the first mixed signal;
mirroring current of the another leg of the differential in-phase current component to produce a second mirrored in-phase current component;
mixing the second mirrored in-phase current component with another leg of the in-phase component of the local oscillation to produce another leg of the first mixed signal;
mirroring the one leg of the quadrature current component to produce a first mirrored quadrature current component;
mixing the first mirrored quadrature current component with one leg of a quadrature component of the local oscillation to produce one leg of the second mixed signal;
mirroring the another leg of the quadrature current component to produce a second mirrored quadrature current component; and
mixing the second mirrored quadrature current component with another leg of the quadrature component of the local oscillation to produce another leg of the second mixed signal.

14. The method of claim 13 further comprises:
low pass filtering the first mirrored in-phase current component prior to mixing;
low pass filtering the second mirrored in-phase current component prior to mixing;
low pass filtering the first mirrored quadrature current component prior to mixing; and
low pass filtering the second quadrature current component prior to mixing.

15. A single side band transmitter comprises:
means for modulating, in accordance with a modulation protocol, data to produce an in-phase current component and a quadrature phase current component;
means for maintaining the in-phase current component and the quadrature phase current component in a current domain when mixing with a local oscillation to produce a first mixed signal and a second mixed signal;
means for summing the first and second mixed signals to produce a radio frequency signal; and
means for amplifying the radio frequency signal prior to transmission.

16. The single side band transmitter of claim 15, wherein the means for maintaining the in-phase current component and the quadrature current component in the current domain further functions to:
mirror current of the in-phase current component to produce a mirrored in-phase current component;
mix the mirrored in-phase current component with an in-phase component of the local oscillation to produce the first mixed signal;
mirror the quadrature current component to produce a mirrored quadrature current component; and
mix the mirrored quadrature current component with a quadrature component of the local oscillation to produce the second mixed signal.

17. The single side band transmitter of claim 16, wherein the means for maintaining the in-phase current component and the quadrature current component in the current domain further functions to:
low pass filter the mirrored in-phase current component prior to the mixing; and
low pass filter the mirrored quadrature current component prior to the mixing.

18. The single side band transmitter of claim 15, wherein the means for modulating the data further functions to perform at least one of:
modulating the data in accordance with frequency shift keying;
modulating the data in accordance with binary phase shift keying;
modulating the data in accordance with quadrature phase shift keying;
modulating the data in accordance with quadrature amplitude modulation; and
modulating the data in accordance with frequency modulation.

19. The single side band transmitter of claim 15, wherein the means for modulating the data further functions to:
modulate the data to produce a digital in-phase component and a digital quadrature component;
convert the digital in-phase component into the in-phase current component; and
convert the digital quadrature component into the quadrature current component.

20. The single side band transmitter of claim 15, wherein the means for modulating the data further functions to:
produce a differential digital in-phase component and a differential digital quadrature component;
convert one leg of the differential digital in-phase component into one leg of a differential in-phase current component;
convert another leg of the differential digital in-phase component into another leg of the differential in-phase current component;
convert one leg of the differential digital quadrature component into one leg of a differential quadrature current component; and
convert another leg of the differential digital quadrature component into another leg of the differential quadrature current component.

21. The single side band transmitter of claim 20, wherein the means for maintaining the in-phase current component and the quadrature phase current component in a current domain further functions to:
mirror current of the one leg of the differential in-phase current component to produce a first mirrored in-phase current component;
mix the first mirrored in-phase current component with one leg of an in-phase component of the local oscillation to produce one leg of the first mixed signal;
mirror current of the another leg of the differential in-phase current component to produce a second mirrored in-phase current component;
mix the second mirrored in-phase current component with another leg of the in-phase component of the local oscillation to produce another leg of the first mixed signal;
mirror the one leg of the quadrature current component to produce a first mirrored quadrature current component;

mix the first mirrored quadrature current component with one leg of a quadrature component of the local oscillation to produce one leg of the second mixed signal;

mirror the another leg of the quadrature current component to produce a second mirrored quadrature current component; and mix the second mirrored quadrature current component with another leg of the quadrature component of the local oscillation to produce another leg of the second mixed signal.

22. The single side band transmitter of claim 21, wherein the means for maintaining the in-phase current component and the quadrature phase current component in a current domain further functions to:

low pass filter the first mirrored in-phase current component prior to mixing;

low pass filter the second mirrored in-phase current component prior to mixing;

low pass filter the first mirrored quadrature current component prior to mixing; and low pass filter the second quadrature current component prior to mixing.

* * * * *